Dec. 30, 1958 W. M. SCHOLL 2,866,229
APPARATUS FOR FORMING ARCH SUPPORTS
Filed March 7, 1955 2 Sheets-Sheet 1

INVENTOR.
WILLIAM M SCHOLL
BY
Hill, Sherman, Meroni, Gross + Simpson
ATTYS.

Dec. 30, 1958        W. M. SCHOLL        2,866,229
APPARATUS FOR FORMING ARCH SUPPORTS
Filed March 7, 1955        2 Sheets-Sheet 2
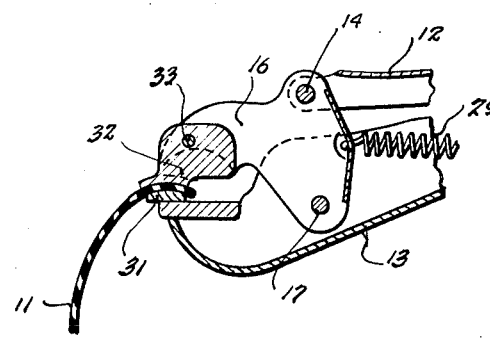
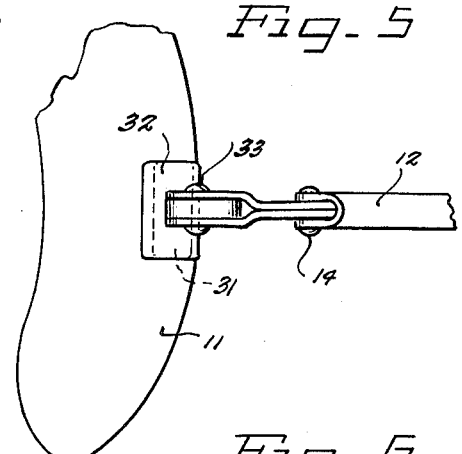
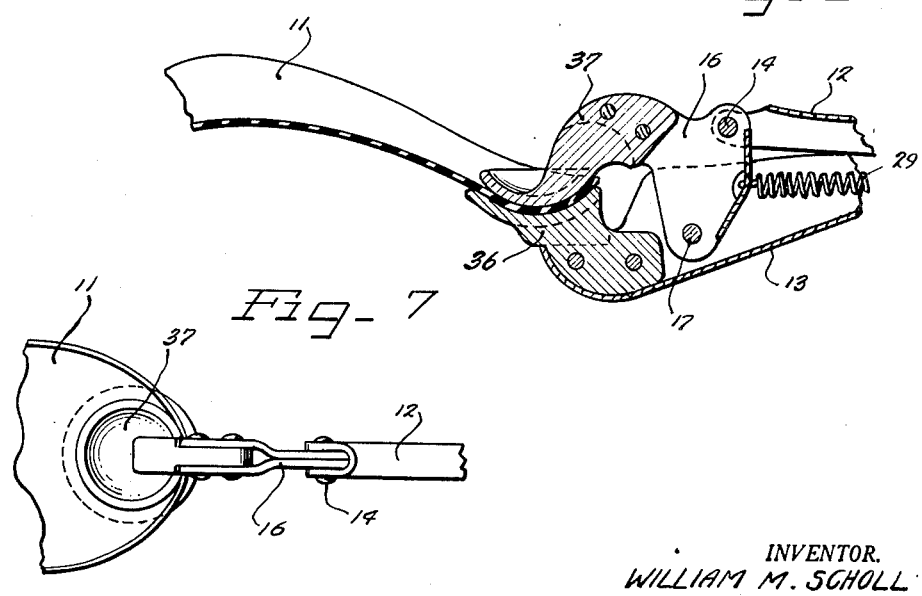
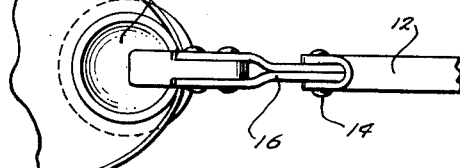
INVENTOR.
WILLIAM M. SCHOLL
BY
Hill, Sherman, Meroni, Gross & Simpson
ATTYS.

United States Patent Office 2,866,229
Patented Dec. 30, 1958

2,866,229
APPARATUS FOR FORMING ARCH SUPPORTS
William M. Scholl, Chicago, Ill.
Application March 7, 1955, Serial No. 492,392
4 Claims. (Cl. 18—19)

The present invention is directed generally to apparatus for shaping pressure-deformable materials, and is particularly directed to the manufacture of arch supports positionable under the plantar surface of the human foot. The manufacture of such arch supports from both metal and modern synthetic resins and the like in a rapid and efficient manner has always posed a problem because of the sometime intricate contours which had to be achieved in portions of the support.

In the past, extreme difficulty has been experienced in providing an arch support or the like to particularly fit an individual foot. While the supports are initially stamped, pressed or molded into somewhat standard sizes and contoured shapes in general following the plantar surface of a normal foot, all feet needing treatment are not and were not initially truly normal and in order to properly as well as comfortably fit an arch support certain adjustments in contour are essential at the time of fitting. Sometimes, further adjustments are necessary to vary the depths and heights of depressions and elevations, curvatures, etc., during use as the foot responds to treatment.

With the foregoing in mind, it is an important object of the instant invention to provide a simple form of instrument or instruments for readily varying the contour of an arch support or the like at a particular location.

Another feature of the present invention resides in the provision of a simplified tool which is capable of supplying uniform deformation pressure for as long a period of time as is desired to a pressure-deformable blank. Such blanks may consist, for example, of metal, synthetic resinous materials, or resin impregnated fabrics such as canvas.

Also an object of the present invention is to provide an improved apparatus for shaping or reshaping pressure-deformable blanks into contoured surfaces of desired depth, elevation, and curvature.

Another object of the invention is to provide an improved tool for shaping blanks into arch supporting surfaces in a convenient and rapid manner.

These and other objects and features of the present invention will be apparent to those skilled in the art in the following description of the attached sheets of drawings which illustrate several preferred embodiments of the invention.

Figure 1:
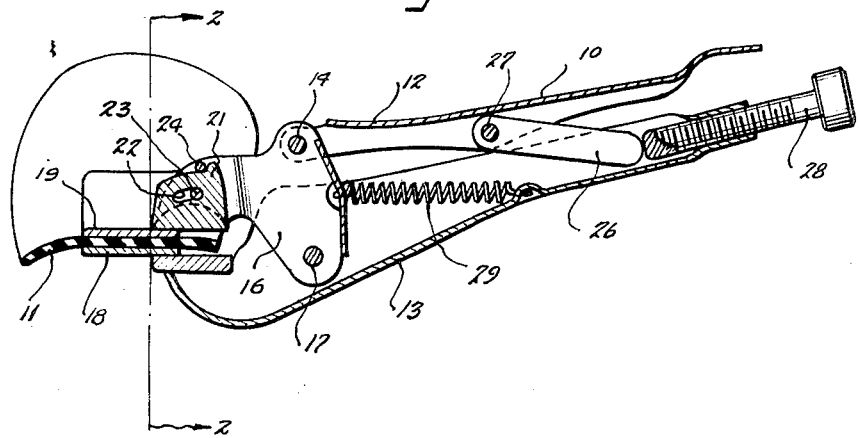
Figure 2:
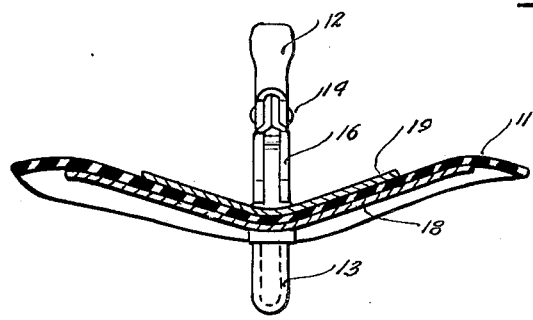
Figure 3:
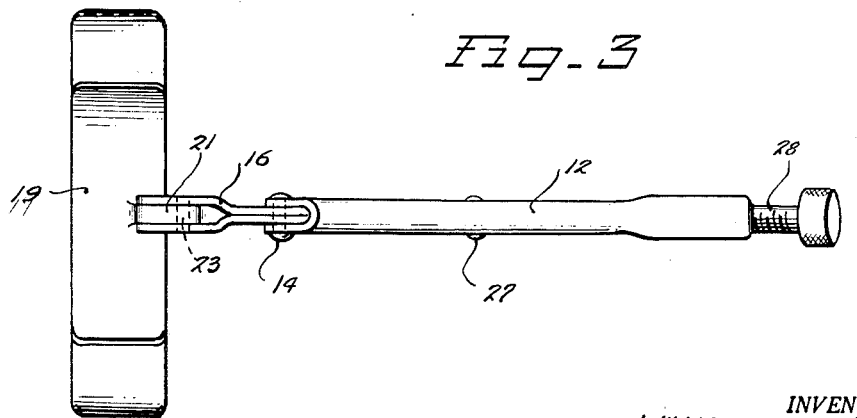

In the drawings:
Figure 1 is a vertical sectional view, with parts shown in elevation, illustrating one form of tool embodying principles of the present invention;
Figure 2 is a cross-sectional view taken substantially along the line II—II of Figure 1;
Figure 3 is a plan view of the shaping tool shown in Figures 1 and 2;
Figure 4 is a fragmentary, cross-sectional view, with parts in elevation of a modified form of shaping tool;
Figure 5 is a plan view of the assembly shown in Figure 4;
Figure 6 is another fragmentary, cross-sectional view of still another form of shaping head; and
Figure 7 is a plan view of the tool shown in Figure 6.

As shown in the drawings:
In Figure 1, reference numeral 10 indicates generally a shaping tool which is arranged to engage a pressure deformable arch support or blank 11 to shape or adjust the blank into contours which support the inner and outer longitudinal arch of the foot. As illustrated in Figures 1 through 3, the tool 10 may include an upper handle member 12 and a lower member handle 13, both handle members 12 and 13 having generally U-shaped cross sections throughout a major portion of their lengths.

The forward end of the upper handle member 12 is pivoted about a pin 14 which passes through a cam 16 having a bifurcated front portion, as best seen in Figure 2. The entire cam 16 is pivotally movable about a pin 17 extending between the opposed marginal portions of the lower member handle 13.

The forward end of the lower member handle 13 has secured to it an arcuate lower shaping member 18 whose configuration is best apparent from an inspection of Figure 2. The lower shaping member 18 is arranged to cooperate with a complemental upper shaping member 19 secured to the forward end of the cam 16. Provision is made for a slight amount of relative movement between the upper shaping member 19 and the cam 16 by providing a flange portion 21 on the upper shaping member 19 and including a slot 22 within the flange portion 21. The slot 22 receives a pin 23 therethrough to permit a slight amount of adjustment between the confronting faces of the upper shaping member 18. A pin 24 limits the extent of the adjustment by providing an abutment which engages an end of the flange 21, as best seen in Figure 1.

The tool shown in the drawings is also provided with a mechanism for holding the pressure deformable blank 11 at a desired pressure for any desired interval of time. For this purpose, the tool is provided with a toggle link 26 which is pivotally supported from the upper handle member 12 by means of a pin 27. The pressure at which the upper shaping member 19 engages the lower shaping member 18 is dependent upon the amount of relative movement provided between the upper handle member 12 and the lower handle member 13. This degree of relative movement, in turn, is dependent upon the position of the toggle link 26. The relative position of the latter is adjusted by means of an adjusting bolt 28 which is received in threaded engagement through the end of the lower handle member 13. It will be seen that threading the bolt inwardly shifts the pivotal axis about the pin 27 in a forward direction and enables the shaping members 18 and 19 to be locked in closer spaced relationship, while threading the bolt 28 outwardly will result in leaving a greater gap between the shaping members 18 and 19 in the pressure applying position, the position shown in Figure 1. A helical coiled spring 29 has one end secured to the cam 16, and its opposite end received within a suitable aperture in the lower handle member 13 to maintain the jaws of the device locked in the overcenter position of the toggle link 26.

As illustrated in Figures 1 to 3, the shaping members 18 and 19 may take the form of complementarily shaped arcuate surfaces between which the blank 11 is compressed to the desired degree. The particular shape employed in Figures 1 to 3 is particularly designed to fashion and adjust elevational portions of the arch support which support the inner and outer longitudinal arches.

The same mechanism, is however, applicable to the use of other forms of shaping members, as seen in Figures 4 through 7. If desired, these various shaping members can be manufactured in the form of replaceable jaws for the tool or they can constitute permanent parts of separate tools. The particular shape of forming members shown in Figures 4 and 5 is arranged to make curved marginal portions at various points along the arch support and particularly around the heel seat thereof. In this form of the invention, there is provided a lower gripping jaw 31 having a slightly convex outer surface which cooperates with a slightly concave, complementarily shaped surface of an upper jaw 32. The latter is pivotally supported from the cam 16 by means of a pin 33. Otherwise, the details of the tool are identical to those shown in Figure 1, and include a toggle mechanism which, in its locked, overcenter position, serves to position the jaw 32 with respect to the jaw 31 with an adjustable spacing therebetween.

The form of the invention illustrated in Figures 6 and 7 employs a pair of jaws 36 and 37 secured to the lower handle member 13 and the cam 16, respectively. The shaping surfaces on the jaws 36 and 37 take the form of segmental spherical surfaces of suitable diameter so that they can be placed in substantially nesting engagement. A shaping tool of this type is particularly valuable for shaping the metatarsal lift portion of the arch support.

While it might be possible to shape an arch support from an initially flat blank with a sufficient number of tools embodying the instant invention, especially if the support was of plastic material, the main purpose of the invention is to provide a means of making quick and accurate adjustments to better fit an arch support to a particular foot. One or more configurations of the support may be varied readily by use of this invention.

When the support is made of plastic material, such as thermoplastic, it may be desirable to first heat a shaping tool before application to the support or blank, and it also may be desirable to maintain the blank and tool in a heated location during adjustment. This temperature used, of course, should not be so high as to cause excessive flow of the material during adjustment, but only sufficient to aid the adjustment, the temperature used depending upon the particular material of the support.

The shaping devices of the present invention are extremely simple to operate. All that the operator has to do is to position a portion of the support between the shaping jaws, and move the upper handle member and the lower handle member together until the toggle 26 abuts the bolt 28, whereupon the jaws remain locked in the overcenter position until such time as they are released by disengaging the toggle link 26 from its abutment. The use of the tool of the present invention has been found to decrease substantially the time required for shaping the blanks and provides a degree of control over the shaping which was not possible heretofore, especially when accurate adjustments were to be made at the time of fitting.

It will be evident that various modifications can be made to the described embodiments without departing from the scope of the present invention.

I claim as my invention:

1. An apparatus for shaping arch supports which comprises a pair of complementarily shaped smoothly contoured jaw members, one of said jaw members having a greater transverse dimension than the other jaw, said jaw members including non-planar surfaces arranged to deform a pressure-deformable blank into the arcuately shaped contours characteristic of an arch support.

2. An apparatus for shaping arch supports which comprises a pair of complementarily shaped smoothly contoured jaw members, one of said jaw members having a greater transverse dimension than the other jaw, said jaw members including non-planar surfaces arranged to deform a pressure-deformable blank into arcuately shaped contours, and means for locking said jaws in position along said blank.

3. An apparatus for shaping arch supports which comprises a pair of complementarily shaped smoothly contoured jaw members pivotally connected so as to be movable toward and away from each other, one of said jaw members having a greater transverse dimension than the other jaw, said jaw members including non-planar surfaces arranged to deform a pressure-deformable blank into an arcuately shaped contour forming a portion of an arch support, means for locking said jaws in a preset position, and means for varying the spacing between said surfaces at said preset position.

4. An apparatus for shaping arch supports which comprises a pair of pivoted jaw members, a pair of opposed complementarily shaped smoothly contoured blank engaging members carried by said jaw members, one of said blank engaging members having a greater transverse dimension than the other of said blank engaging members, said blank engaging members being non-planar and being shaped to engage a pressure-deformable blank and deform a portion of said blank into an arcuately shaped contour, and toggle means providing an overcenter link connection between said jaws whereby said jaws may be locked in a predetermined relative position.

References Cited in the file of this patent

UNITED STATES PATENTS

| | | |
|---|---|---|
| 1,177,177 | Felix | Mar. 28, 1916 |
| 1,218,245 | Draver | Mar. 6, 1917 |
| 1,301,721 | McElroy et al. | Apr. 22, 1919 |
| 1,585,284 | De Witt | May 18, 1926 |
| 2,444,420 | Borkland | July 6, 1948 |
| 2,477,689 | Feinbloom | Aug. 2, 1949 |
| 2,574,676 | Waterbury | Nov. 13, 1951 |
| 2,598,650 | Smith et al. | May 27, 1952 |
| 2,685,218 | Burns | Aug. 3, 1954 |
| 2,760,231 | T. St. Clair | Aug. 28, 1956 |